US010122913B2

(12) United States Patent
Kameda

(10) Patent No.: US 10,122,913 B2
(45) Date of Patent: Nov. 6, 2018

(54) IMAGE CAPTURING APPARATUS AND CONTROL METHOD THEREOF, AND STORAGE MEDIUM

(71) Applicant: CANON KABUSHIKI KAISHA, Tokyo (JP)

(72) Inventor: Jun Kameda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/698,043

(22) Filed: Sep. 7, 2017

(65) Prior Publication Data

US 2018/0077339 A1 Mar. 15, 2018

(30) Foreign Application Priority Data

Sep. 9, 2016 (JP) ................................ 2016-177140

(51) Int. Cl.

| | |
|---|---|
| ***H04N 5/232*** | (2006.01) |
| ***H04N 5/343*** | (2011.01) |
| ***H04N 5/347*** | (2011.01) |
| ***H04N 5/369*** | (2011.01) |
| ***G02B 7/28*** | (2006.01) |

(52) U.S. Cl.

CPC ........... *H04N 5/23212* (2013.01); *G02B 7/28* (2013.01); *H04N 5/23293* (2013.01); *H04N 5/343* (2013.01); *H04N 5/347* (2013.01); *H04N 5/3696* (2013.01)

(58) Field of Classification Search

CPC ........... H04N 5/23212; H04N 5/23293; H04N 5/343; H04N 5/347; H04N 5/3696; G02B 7/28; G02B 7/34; G03B 13/36

See application file for complete search history.

(56) References Cited

U.S. PATENT DOCUMENTS

2015/0077603 A1* 3/2015 Matsuzawa .............. H04N 5/77 348/297
2015/0103232 A1* 4/2015 Hamano ............ H04N 5/23212 348/349
2016/0006925 A1* 1/2016 Yamada ............ H04N 5/23212 348/703
2016/0337578 A1* 11/2016 Kikuchi ............ H04N 5/23212

FOREIGN PATENT DOCUMENTS

JP 2015-082721 A 4/2015

* cited by examiner

*Primary Examiner* — Paul Berardesca
(74) *Attorney, Agent, or Firm* — Cowan, Liebowitz & Latman, P.C.

(57) ABSTRACT

An image capturing apparatus includes: an image sensor; a readout unit capable of switching between carrying out a first readout operation of reading out signals from photoelectric conversion elements corresponding to a first number of pupil areas and a signal obtained by adding together signals from the photoelectric conversion elements corresponding to all of the pupil areas, and a second readout operation of reading out signals from photoelectric conversion elements corresponding to a second number and a signal obtained by adding together signals from the photoelectric conversion elements corresponding to all of the pupil areas; and a control unit that controls whether to cause the readout unit to carry out the first readout operation or the second readout operation in accordance with a status of the image capturing apparatus.

10 Claims, 9 Drawing Sheets

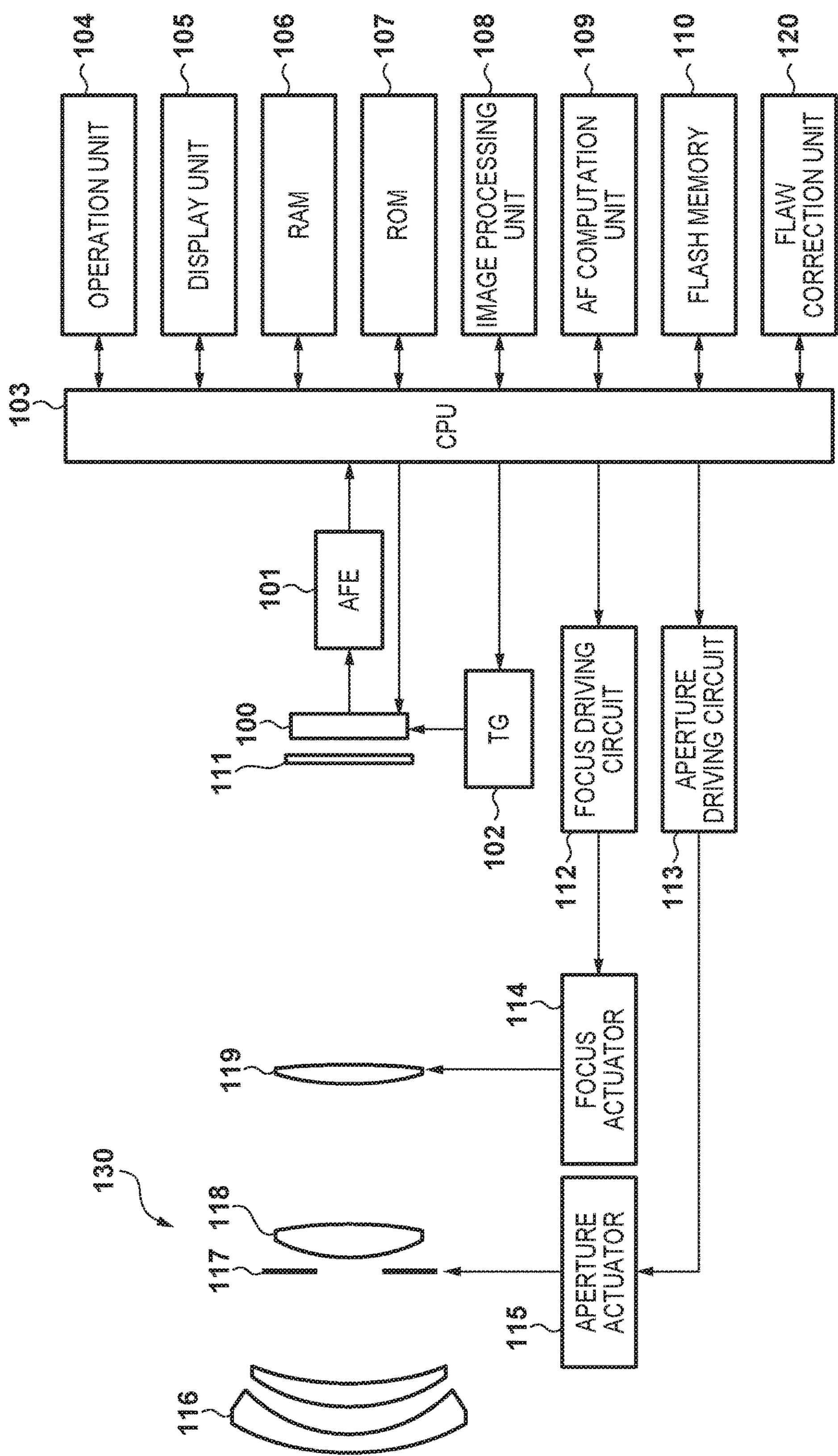
F I G. 1
OPERATION UNIT
DISPLAY UNIT
RAM
ROM
IMAGE PROCESSING UNIT
AF COMPUTATION UNIT
FLASH MEMORY
FLAW CORRECTION UNIT
CPU
AFE
TG
FOCUS DRIVING CIRCUIT
APERTURE DRIVING CIRCUIT
FOCUS ACTUATOR
APERTURE ACTUATOR
100
101
102
103
104
105
106
107
108
109
110
111
112
113
114
115
116
117
118
119
120
130

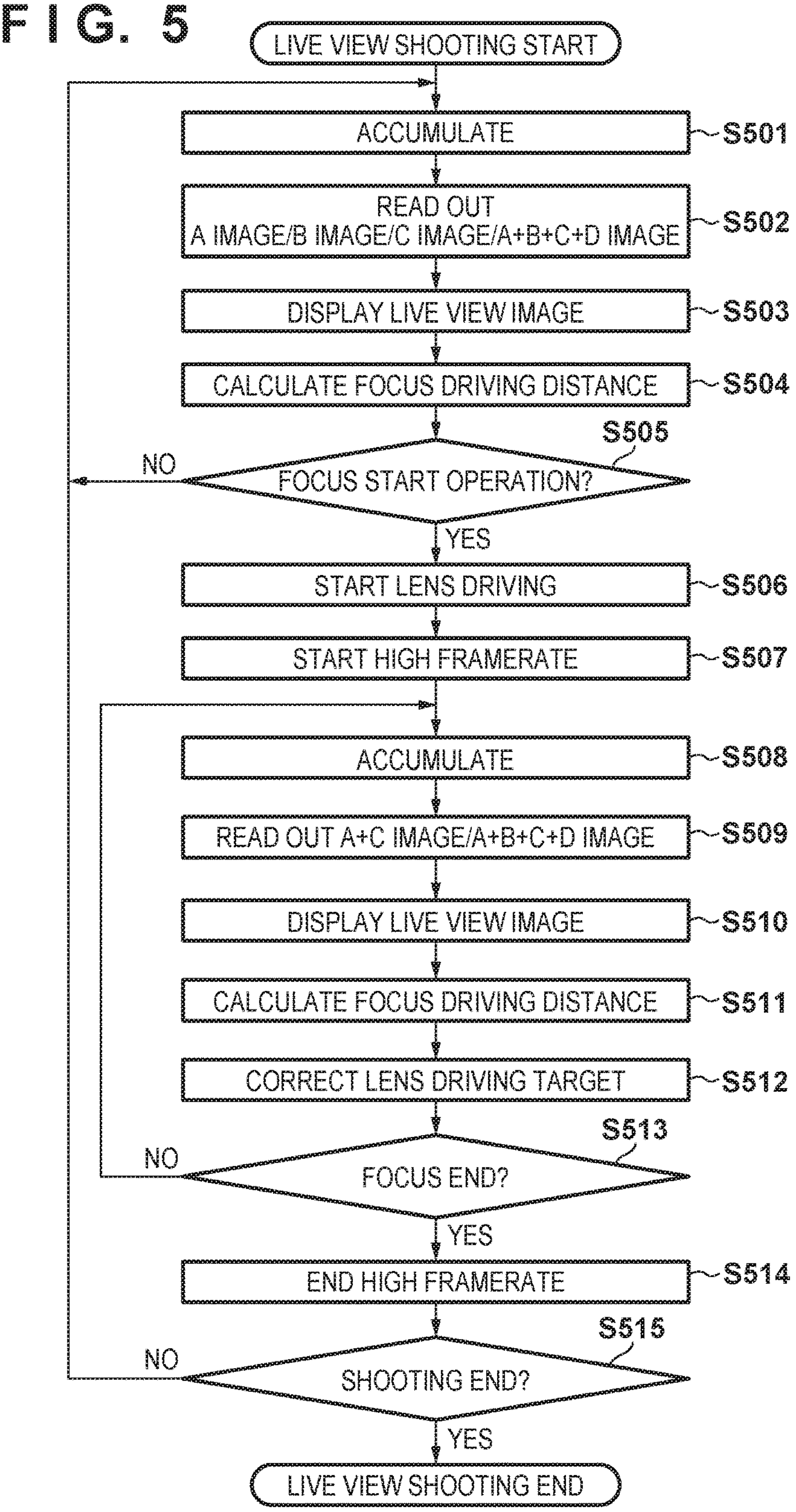
F I G. 5
LIVE VIEW SHOOTING START
ACCUMULATE
S501
READ OUT
A IMAGE/B IMAGE/C IMAGE/A+B+C+D IMAGE
S502
DISPLAY LIVE VIEW IMAGE
S503
CALCULATE FOCUS DRIVING DISTANCE
S504
S505
NO
FOCUS START OPERATION?
YES
START LENS DRIVING
S506
START HIGH FRAMERATE
S507
ACCUMULATE
S508
READ OUT A+C IMAGE/A+B+C+D IMAGE
S509
DISPLAY LIVE VIEW IMAGE
S510
CALCULATE FOCUS DRIVING DISTANCE
S511
CORRECT LENS DRIVING TARGET
S512
S513
NO
FOCUS END?
YES
END HIGH FRAMERATE
S514
S515
NO
SHOOTING END?
YES
LIVE VIEW SHOOTING END

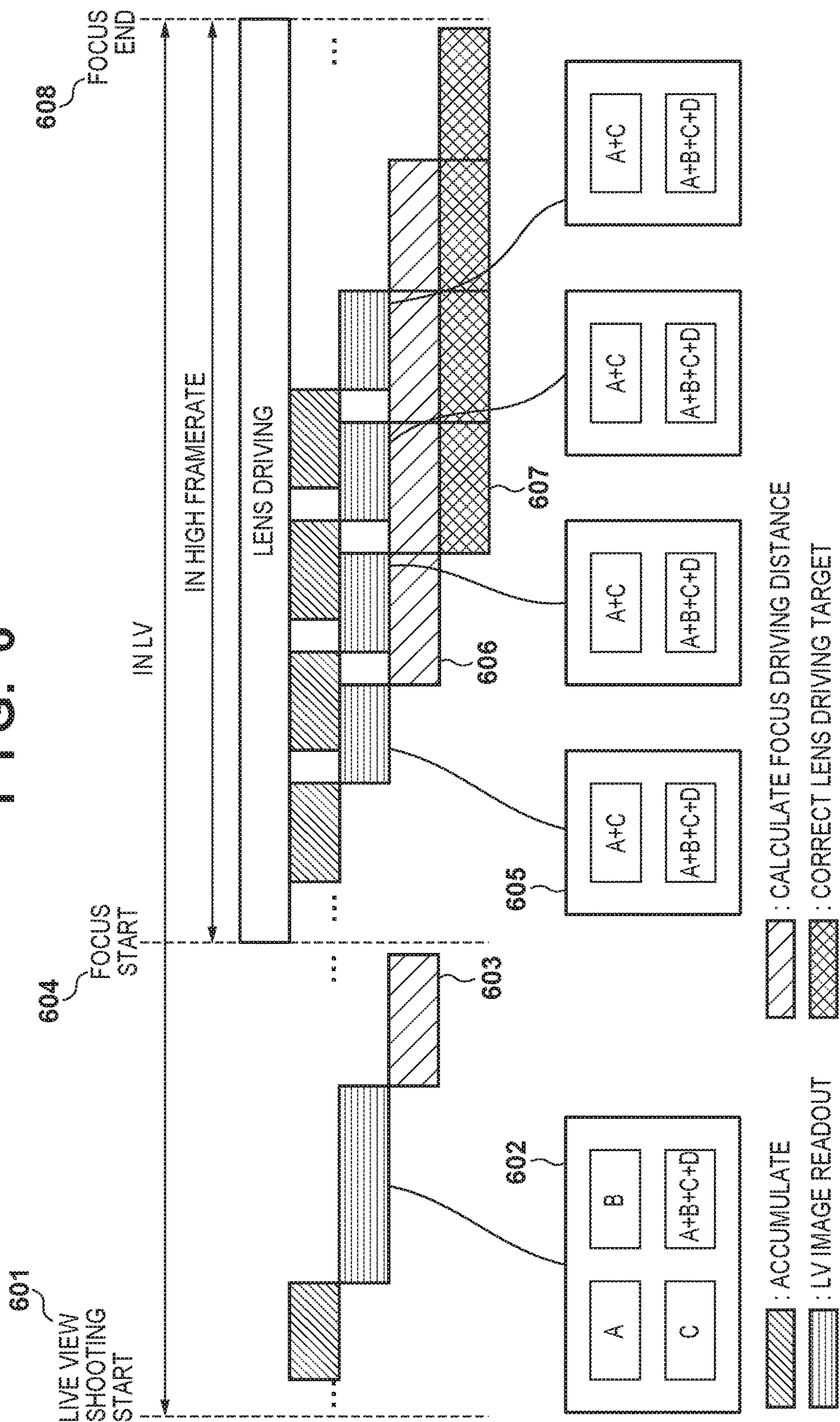
F I G. 6
LIVE VIEW SHOOTING START
601
602
A
B
C
A+B+C+D
603
604
FOCUS START
605
A+C
A+B+C+D
606
607
608
FOCUS END
IN LV
IN HIGH FRAMERATE
LENS DRIVING
: ACCUMULATE
: LV IMAGE READOUT
: CALCULATE FOCUS DRIVING DISTANCE
: CORRECT LENS DRIVING TARGET

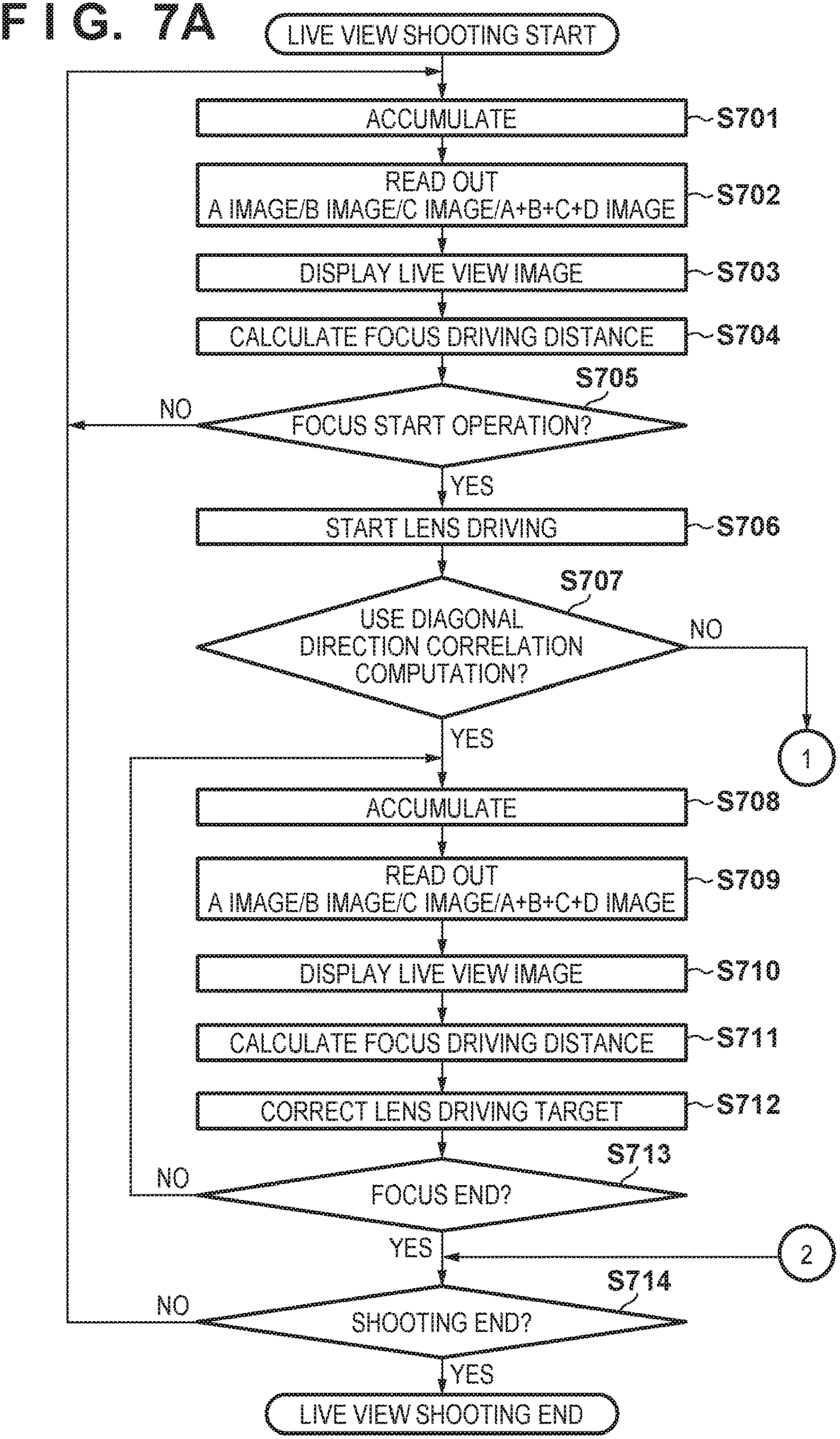
FIG. 7A
LIVE VIEW SHOOTING START
ACCUMULATE
S701
READ OUT
A IMAGE/B IMAGE/C IMAGE/A+B+C+D IMAGE
S702
DISPLAY LIVE VIEW IMAGE
S703
CALCULATE FOCUS DRIVING DISTANCE
S704
S705
FOCUS START OPERATION?
NO
YES
START LENS DRIVING
S706
S707
USE DIAGONAL DIRECTION CORRELATION COMPUTATION?
NO
YES
1
ACCUMULATE
S708
READ OUT
A IMAGE/B IMAGE/C IMAGE/A+B+C+D IMAGE
S709
DISPLAY LIVE VIEW IMAGE
S710
CALCULATE FOCUS DRIVING DISTANCE
S711
CORRECT LENS DRIVING TARGET
S712
S713
FOCUS END?
NO
YES
2
S714
SHOOTING END?
NO
YES
LIVE VIEW SHOOTING END F I G. 7B
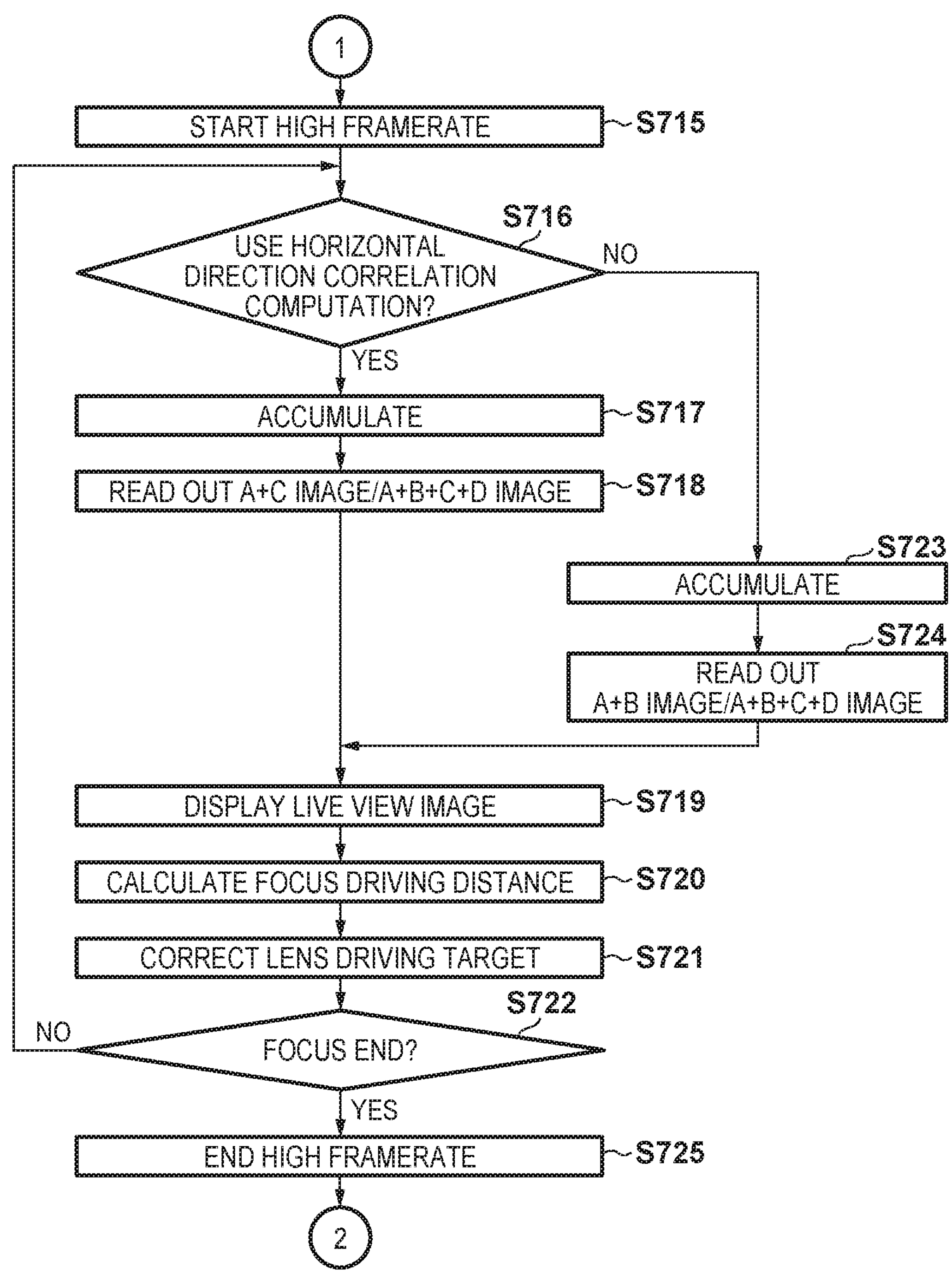

LIVE VIEW SHOOTING START
801
802
A
B
C
A+B+C+D
803
804
FOCUS START
IN LV
IN HIGH FRAMERATE
LENS DRIVING
805
806
807
808
FOCUS END
809
A+C
A+B
A+B+C+D
810
811
812
813
: ACCUMULATE
: LV IMAGE READOUT
: CALCULATE FOCUS DRIVING DISTANCE
: CORRECT LENS DRIVING TARGET

IMAGE CAPTURING APPARATUS AND CONTROL METHOD THEREOF, AND STORAGE MEDIUM

BACKGROUND OF THE INVENTION

Field of the Invention

The invention relates to an image capturing apparatus capable of focus detection in an imaging plane.

Description of the Related Art

A conventional image sensor having pixels in which a plurality of photodiodes are arranged for a single microlens, and that has a function of dividing a pupil of an imaging optical system, is known. This image sensor can obtain disparate subject images passing through different pupil areas of the imaging optical system, and is thus capable of phase difference focus detection (AF) in the image sensor plane.

In such an image sensor, it is necessary to obtain signals from each of the photodiodes corresponding to a single microlens in order to carry out focus detection, whereas it is necessary to obtain a signal by adding the signals of the photodiodes together in order to obtain a normal image.

Japanese Patent Laid-Open No. 2015-082721 discloses a method of control for a case where adjacent photodiodes are connected to each other via gates, and the signals of the photodiodes are added together or are not added together depending on the application. For example, photodiodes adjacent in the vertical direction are connected together and the signals output thereby are added to obtain an image having disparity in the horizontal direction. Likewise, photodiodes adjacent in the horizontal direction are connected together and the signals output thereby are added to obtain an image having disparity in the vertical direction. Obtaining disparate image signals makes it possible to detect a defocus amount of a shooting lens, generate a three-dimensional image, make fine focus adjustments through refocusing, and so on.

Incidentally, when shooting a moving picture or shooting using a live view in an image capturing apparatus, it is necessary to obtain an image signal for display at a framerate suited to the application. In the case where an image signal for display is obtained from pixels in which the imaging optical system undergoes pupil division, it is necessary to add all of the signals output from the plurality of photodiodes corresponding to a single microlens as described above to obtain an image signal without disparity.

Meanwhile, in the case where imaging plane phase difference AF is carried out using the same pixel configuration, it is necessary to obtain disparate image signals from the plurality of photodiodes corresponding to a single microlens and then detect an image shift amount. In this case, as the number of pupil divisions increases, the number of detectable phase shifts and directions increases as well, which makes it possible to improve the accuracy of the focus. However, an increased number of pupil divisions also results in an increased number of pixel signals being read out, which lengthens the readout time.

A longer pixel signal readout time limits the framerate. Conversely, if the framerate can be set to a fast framerate, the sampling rate for calculating the image shift amount will also be faster. This makes it possible to improve the accuracy of focusing on moving subjects in particular, increase the speed of the focus from searching for a subject in a blurred state to reaching the final state of focus, and so on. As such, it is desirable to ensure a relatively high image framerate while also increasing the number of pupil divisions.

Japanese Patent Laid-Open No. 2015-082721 discloses a method in which the framing of the image capturing apparatus (vertical position framing or horizontal position framing) is determined and the direction in which the photodiodes are connected is switched in accordance with a result of the determination, to obtain an image signal having the required disparity for generating a viewable three-dimensional image. However, this document makes no mention of processing in the case where the image signal readout time is limited.

SUMMARY OF THE INVENTION

Having been achieved in light of the above-described issues, the invention suppresses a drop in the framerate of an image while increasing a number of pupil divisions in an image capturing apparatus capable of focus detection in an imaging plane.

According to a first aspect of the present invention, there is provided an image capturing apparatus comprising: an image sensor in which pixels are arrayed two-dimensionally, each of the pixels including a plurality of photoelectric conversion elements for a single microlens; a readout unit capable of switching between carrying out a first readout operation of reading out, from the image sensor and at a first framerate, signals from photoelectric conversion elements corresponding to a first number of pupil areas among a plurality of pupil areas of an imaging optical system and a signal obtained by adding together signals from the photoelectric conversion elements corresponding to all of the pupil areas among the plurality of pupil areas of the imaging optical system, and a second readout operation of reading out, from the image sensor and at a second framerate, signals from photoelectric conversion elements corresponding to a second number, different from the first number, of pupil areas among the plurality of pupil areas of the imaging optical system and a signal obtained by adding together signals from the photoelectric conversion elements corresponding to all of the pupil areas among the plurality of pupil areas of the imaging optical system; and a control unit that controls whether to cause the readout unit to carry out the first readout operation or the second readout operation in accordance with a status of the image capturing apparatus.

According to a second aspect of the present invention, there is provided a method of controlling an image capturing apparatus including an image sensor in which pixels are arrayed two-dimensionally, each of the pixels including a plurality of photoelectric conversion elements for a single microlens, the method comprising: switching between carrying out a first readout operation of reading out, from the image sensor and at a first framerate, signals from photoelectric conversion elements corresponding to a first number of pupil areas among a plurality of pupil areas of an imaging optical system and a signal obtained by adding together signals from the photoelectric conversion elements corresponding to all of the pupil areas among the plurality of pupil areas of the imaging optical system, and a second readout operation of reading out, from the image sensor and at a second framerate, signals from photoelectric conversion elements corresponding to a second number, different from the first number, of pupil areas among the plurality of pupil areas of the imaging optical system and a signal obtained by adding together signals from the photoelectric conversion elements corresponding to all of the pupil areas among the plurality of pupil areas of the imaging optical system; and controlling whether to cause the first readout operation or the second readout operation to be carried out in accordance with a status of the image capturing apparatus.

Further features of the invention will become apparent from the following description of exemplary embodiments with reference to the attached drawings.

BRIEF DESCRIPTION OF THE DRAWINGS

FIG. 1 is a schematic diagram illustrating the overall configuration of an image capturing apparatus according to embodiments of the invention.

FIG. 5 is a flowchart illustrating operations in live view shooting according to a first embodiment.

FIG. 6 is a timing chart of the operations in live view shooting according to the first embodiment.

FIGS. 7A and 7B are flowcharts illustrating operations in live view shooting according to a second embodiment.

DESCRIPTION OF THE EMBODIMENTS

Figure 2:
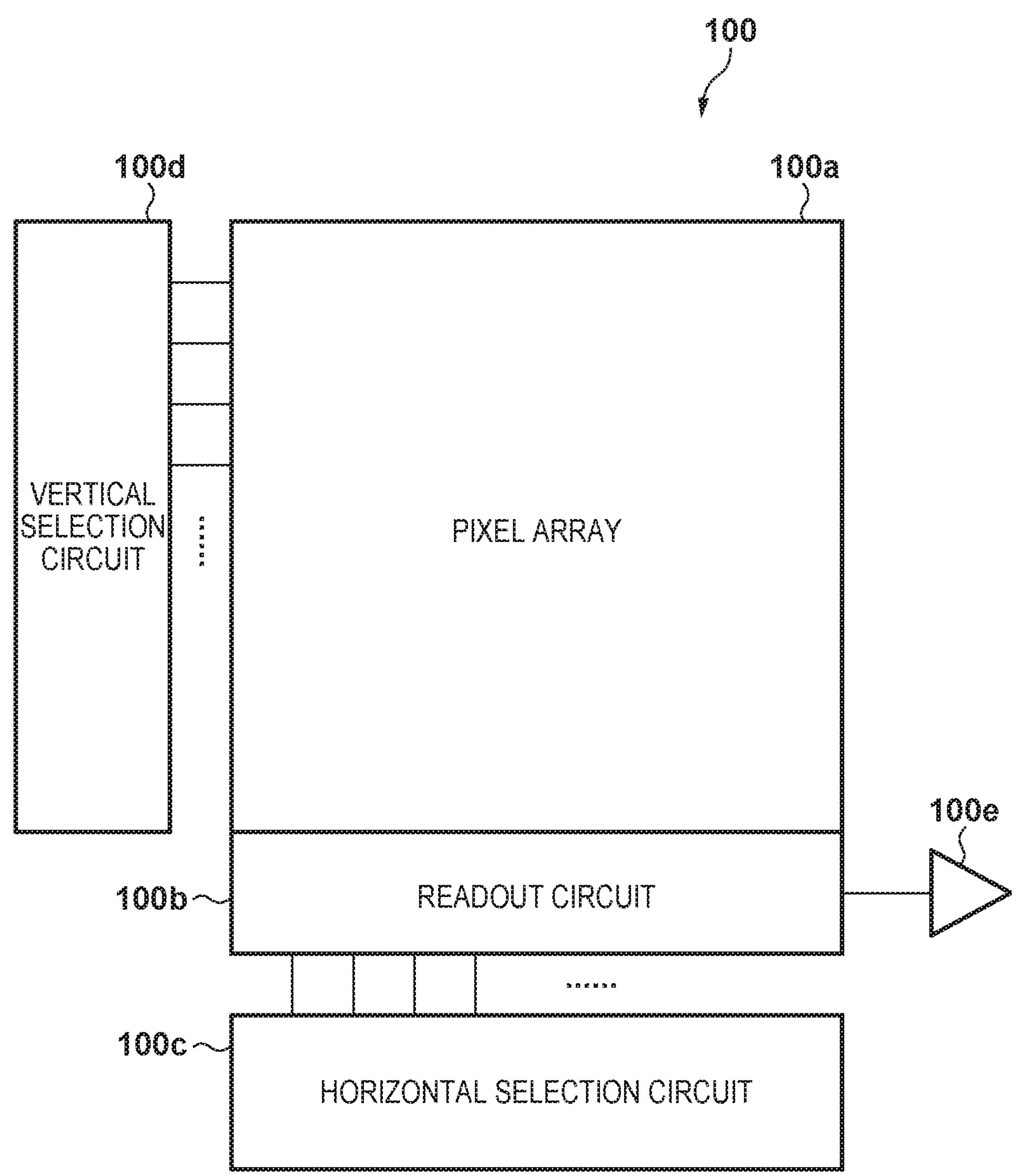
FIG. 2 is a diagram illustrating the configuration of an image sensor according to embodiments of the invention.

Hereinafter, embodiments of the invention will be described in detail with reference to the appended drawings.

First Embodiment

FIG. 1 is a block diagram illustrating the configuration of an image capturing apparatus according to a first embodiment of the invention. In FIG. 1, an image sensor 100 converts a subject image formed by an imaging optical system 130 into an electrical signal. The image sensor 100 is controlled by a CPU 103 and the like (mentioned later), and obtains image signals for still images or moving pictures. An analog front end (AFE) 101 carries out gain adjustment, digital conversion corresponding to a predetermined quantization bit, and so on an analog image signal output from the image sensor 100. A timing generator (TG) 102 controls driving timings of the image sensor 100 and the AFE 101. Although the AFE 101 and the TG 102 are arranged outside of the image sensor 100 in this embodiment, the configuration may be such that these units are included in the image sensor 100.

RAM 106 functions both as memory for storing image data converted into a digital signal by the AFE 101 and image data processed by an image processing unit 108 (mentioned later), and as a work memory when the CPU 103 carries out operations (described later). Although this embodiment describes these functions as being implemented using the RAM 106, other memory can be employed as long as the access speed thereof is sufficiently fast and is of a level that does not pose any problems from an operational standpoint. ROM 107 stores programs loaded and executed for the CPU 103 to control the operations of the various constituent elements. Although Flash-ROM is used in this embodiment, this is merely one example, and other memory can be employed as long as the access speed thereof is sufficiently fast and is of a level that does not pose any problems from an operational standpoint.

The CPU 103 controls the image capturing apparatus as a whole. As described above, the CPU 103 executes programs for controlling the various constituent elements of the image sensor 100. The image processing unit 108 carries out processing such as correcting and compressing still images or moving images that have been shot. The image processing unit 108 also has a function for generating B image data, which will be described later, as well as a function for generating still images and moving images.

An autofocus computation unit (AF computation unit) 109 carries out focus detection using focus detection data to perform focus adjustment (AF). Flash memory 110 is removable memory for recording still image data and moving image data. Although flash memory is used as a recording medium in this embodiment, other non-volatile memory to which data can be written, a hard disk, or the like may be used instead. Such recording media may be built in instead. An operation unit 104 issues shooting commands, settings for shooting conditions and the like, and so on to the CPU 103. A display unit 105 displays still images and moving images that have been shot, menus, and so on.

A first lens group 116 is arranged at a leading end of the imaging optical system 130, and is held so as to be able to extend and retract in an optical axis direction. An aperture 117 adjusts the diameter of an opening therein so as to adjust a light amount during shooting. A second lens group 118 extends and retracts in the optical axis direction integrally with the aperture 117, operating in tandem with the extending and retracting of the first lens group 116 to produce a magnification effect (a zoom function). A third lens group (a focus lens) 119 extends and retracts in the optical axis direction to adjust the focal point of the imaging optical system 130.

A focal plane shutter 111 adjusts an exposure time when shooting still images. Although this embodiment describes a configuration in which the exposure time of the image sensor 100 is adjusted using the focal plane shutter 111, the embodiment is not limited thereto. Instead, the configuration may be such that the image sensor 100 has an electronic shutter function and the exposure time is adjusted using a control pulse. A focus driving circuit 112 controls a focus actuator 114 on the basis of output from the AF computation unit 109, driving the third lens group 119 forward and backward in the optical axis direction so as to adjust the focus. An aperture driving circuit 113 controls the driving of an aperture actuator 115 to control the diameter of the aperture 117.

Next, the configuration of the image sensor 100 and a pixel signal readout operation will be described with reference to FIG. 2. FIG. 2 is a diagram illustrating the configuration of the image sensor 100. As illustrated in FIG. 2, the image sensor 100 includes a pixel array 100*a* in which pixels are arrayed two-dimensionally, a vertical selection circuit 100*d* that selects rows of the pixels in the pixel array 100*a*, and a horizontal selection circuit 100*c* that selects columns of the pixels in the pixel array 100*a*. The image sensor 100 further includes a readout circuit 100*b* for reading out the signals of pixels, of the pixels in the pixel array 100*a*, that have been selected by the vertical selection circuit 100*d* and the horizontal selection circuit 100*c*. The vertical selection circuit 100*d* selects a row in the pixel array 100*a* and activates, in the selected row, a readout pulse output from the TG 102 on the basis of a horizontal synchronization signal output from the CPU 103. The readout circuit 100*b* is provided for each column and includes an amplifier and a memory, and holds the pixel signals of the selected row in the memory via the amplifier. One row's worth of the pixel signals held in the memory is selected in sequence in the column direction by the horizontal selection circuit 100*c*, and is then output to the exterior via an amplifier 100*e*. This operation is repeated for all of the rows, and the signals of all of the pixels are output to the exterior.

Figure 3A:
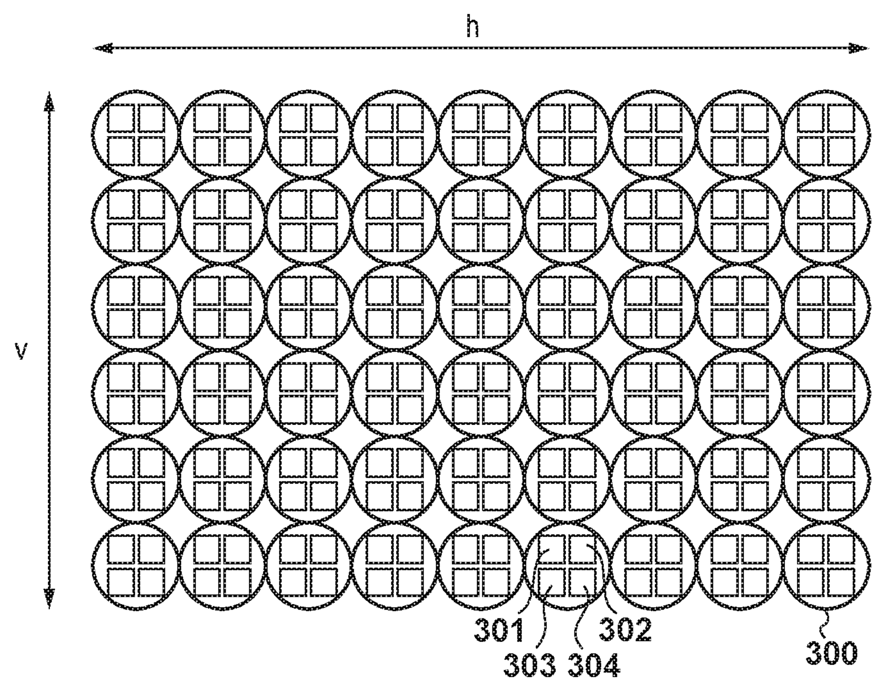
FIGS. 3A and 3B are diagrams illustrating the pixel structure of the image sensor according to embodiments of the invention.

The pixel structure of the image sensor 100 will be described next using FIGS. 3A and 3B. In FIG. 3A, microlenses 300 constitute a microlens array. Photodiodes (PDs) 301, 302, 303, and 304 are photoelectric conversion elements that carry out photoelectric conversion, and constitute an A image photoelectric conversion unit, a B image photoelectric conversion unit, a C image photoelectric conversion unit, and a D image photoelectric conversion unit, respectively (described later). These four PDs are configured such that each single PD is separated into an element separation region. Additionally, a single microlens is arranged above four PDs. In the case where image capturing regions sharing a microlens 300 are taken as a single pixel, h of the pixels are arranged in the horizontal direction and v of the pixels are arranged in the vertical direction in a pixel array region. Signals accumulated by the PD 301, the PD 302, the PD 303, and the PD 304 are output to the exterior in a predetermined readout pattern through the above-described readout operation. Using a pupil division configuration (described later), mutually-disparate individual images enter into the PD 301, the PD 302, the PD 303, and the PD 304. Here, the PD 301 corresponds to the A image photoelectric conversion unit, the PD 302 to the B image photoelectric conversion unit, the PD 303 to the C image photoelectric conversion unit, and the PD 304 to the D image photoelectric conversion unit.

Figure 3B:
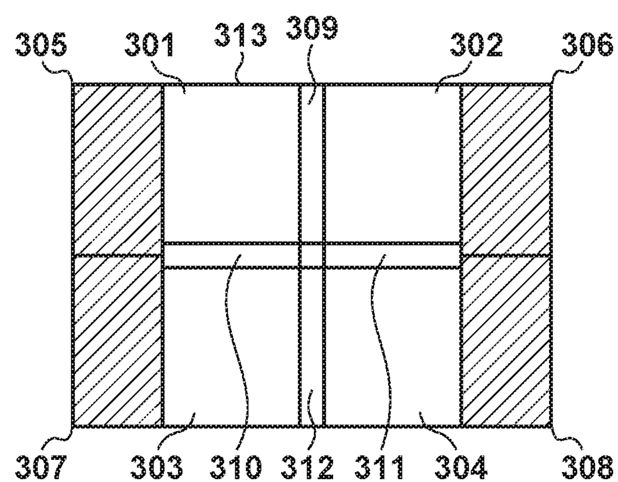

FIG. 3B is a diagram illustrating the pupil division configuration of a pixel. An overall PD 313 is divided into the above-described PD 301, PD 302, PD 303, and PD 304 by element separation regions 309, 310, 311, and 312. Transfer gates 305, 306, 307, and 308 of the PDs 301, 302, 303, and 304 are controlled on and off during pixel signal readout to transfer charges in the PDs 301 to 304 to the readout circuit.

Figure 4A:
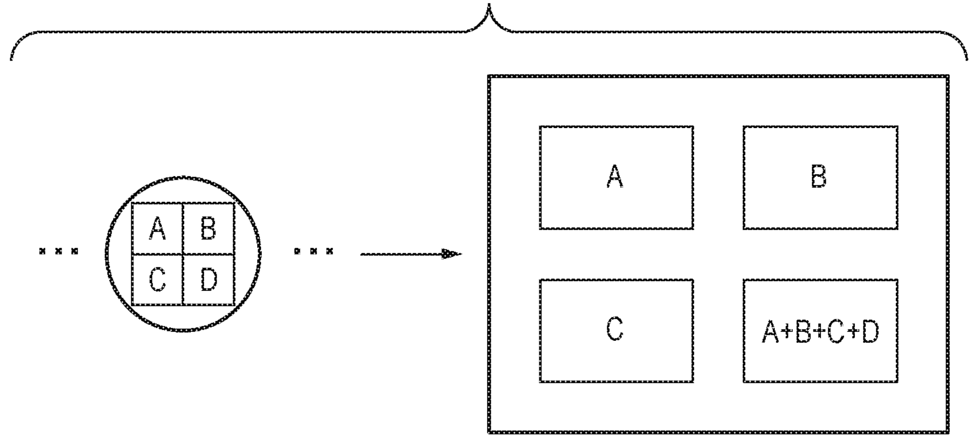
FIGS. 4A to 4C are diagrams illustrating examples of patterns of readout methods for the image sensor according to embodiments of the invention.
Figure 4B:
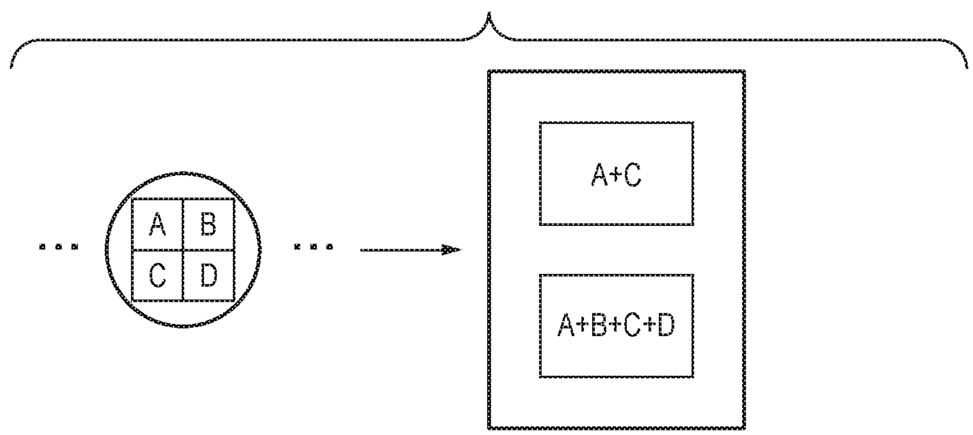
Figure 4C:
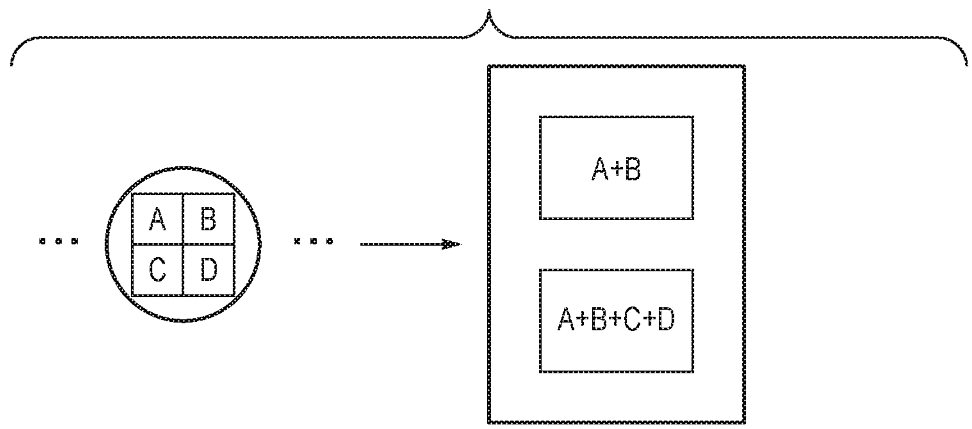

FIGS. 4A to 4C illustrate examples of readout patterns of the pixel signals from the image sensor 100. In the readout pattern illustrated in FIG. 4A, three (a first number) signals, namely an A image, which is an image signal from the PD 301, a B image, which is an image signal from the PD 302, and a C image, which is an image signal from the PD 303, are read out, as well as an (A+B+C+D) image obtained by adding the signals from the PDs 301, 302, 303, and 304. This readout method will be called a "first readout method" hereinafter. Although the (A+B+C+D) image serves as an image for display here, the image for display does not require all of the A image, the B image, the C image, and a D image to be read out. For example, an (A+B+C) image may be used as the image for display. In this case, the (A+B+C) image and, for example, the A image and the B image are read out. In other words, the C image is not read out on its own, and the D image is not read out at all.

In the readout pattern illustrated in FIG. 4B, one (a second number) signal, which is an A+C image obtained by adding the signals from the PDs 301 and 303, and the (A+B+C+D) image obtained by adding the signals from the PDs 301, 302, 303, and 304, are read out. This readout method will be called a "second readout method" hereinafter.

In the readout pattern illustrated in FIG. 4C, an A+B image obtained by adding the signals from the PDs 301 and 302, and the (A+B+C+D) image obtained by adding the signals from the PDs 301, 302, 303, and 304, are read out. This readout method will be called a "third readout method" hereinafter.

An imaging plane phase difference AF method using the read-out pixel signals will be described next. In the case where the image signals read out through the first readout method are loaded into the RAM 106, the CPU 103 transfers the A image, the B image, the C image, and the (A+B+C+D) image stored in the RAM 106 to the image processing unit 108. The image processing unit 108 generates the D image by subtracting the A image, the B image, and the C image from the (A+B+C+D) image. The generated A image, B image, C image, and D image are transferred to the AF computation unit 109, and the AF computation unit 109 computes correlations between the respective images. A horizontal direction correlation computation result can be obtained from a combination (a group) of the A image and the B image, or of the C image and the D image. A vertical direction correlation computation result can be obtained from a combination (a group) of the A image and the C image, or of the B image and the D image. A diagonal direction correlation computation result can be obtained from a combination (a group) of the A image and the D image, or of the B image and the C image.

In the case where the image signals read out through the second readout method are loaded into the RAM 106, the CPU 103 transfers the (A+C) image and the (A+B+C+D) image stored in the RAM 106 to the image processing unit 108. The image processing unit 108 generates a (B+D) image by subtracting the (A+C) image from the (A+B+C+D) image. The generated (A+C) image and (B+D) image are transferred to the AF computation unit 109, and the AF computation unit 109 computes correlations between the respective images. A horizontal direction correlation computation result can be obtained from a combination (a group) of the (A+C) image and the (B+D) image.

In the case where the image signals read out through the third readout method are loaded into the RAM 106, the CPU 103 transfers the (A+B) image and the (A+B+C+D) image stored in the RAM 106 to the image processing unit 108. The image processing unit 108 generates a (C+D) image by subtracting the (A+B) image from the (A+B+C+D) image. The generated (A+B) image and (C+D) image are transferred to the AF computation unit 109, and the AF computation unit 109 computes correlations between the respective images. A vertical direction correlation computation result can be obtained from a combination (a group) of the (A+B) image and the (C+D) image.

The CPU 103 uses an image shift amount calculated on the basis of the correlation computation results to calculate a focus driving distance (a distance to drive the third lens group 119), and sends that focus driving distance to the focus driving circuit 112. The focus driving circuit 112 controls the focus actuator 114 on the basis of the focus driving distance, and drives the third lens group 119 forward and backward in the optical axis direction so as to adjust the focus.

Imaging plane phase difference AF operations according to this embodiment will be described next. FIG. 5 is a flowchart illustrating imaging plane phase difference AF operations carried out during live view operation according to this embodiment. FIG. 6 is a timing chart corresponding to that time.

First, in S501, the image sensor 100 is exposed and accumulates a charge. The exposure is carried out with the CPU 103 keeping the focal plane shutter 111 in an open state. A charge reset timing and a readout start timing are controlled using the TG 102, and thus the charge is accumulated only for a period between those timings. The light amount is controlled by the aperture actuator 115.

In S502, the A image, the B image, the C image, and the (A+B+C+D) image are read out through the first readout method and loaded into the RAM 106. This is carried out at a timing indicated by 602 in FIG. 6. In S503, a live view image is displayed. The (A+B+C+D) image read out in S502 is displayed in the display unit 105.

In S504, using the image signals read out in S502, the focus driving distance is calculated from the vertical direction/horizontal direction/diagonal direction correlation computation results through the above-described imaging plane phase difference AF method. This is carried out at a timing indicated by 603 in FIG. 6.

In S505, the CPU 103 determines whether or not a focus start operation has been made through the operation unit 104. Although whether or not the focus start operation has been made is used as a determination condition in this embodiment, the determination may be made on the basis of a condition aside from the focus start operation. The process moves to S506 in the case where the focus start operation has been made in S505. However, in the case where the focus start operation has not been made, the process returns to S501, and the live view shooting and imaging plane phase difference AF are continued.

The operations from the start timing, indicated by 601 in FIG. 6, to the timing indicated by 604, are executed repeatedly from S501 to S505. During this repetition, the vertical direction, horizontal direction, and diagonal direction correlation computations are made repeatedly at the timing indicated by 603 using the A image, the B image, the C image, and the (A+B+C+D) image read out at the timing indicated by 602.

In S506, focus adjustment is started using the focus driving distance calculated in S504. The driving of the third lens group 119 forward and backward starts as a result. In S507, the timing of the TG 102 is changed to a timing corresponding to a high framerate. The change to the high framerate is made in order to increase the number of times a signal is sampled per unit time for focus detection so as to carry out the AF quickly. In the case where the framerate is changed to the high framerate, the readout method is changed from the first readout method to the second readout method, which has a shorter readout time than the first readout method.

A case where the readout times of the signals in the first readout method, before the framerate change, are as follows will be described as an example.

A image: 8 ms; B image: 8 ms; C image: 8 ms (A+B+C+D) image: 8 ms

Reading out the above-described image signals from all regions of the image sensor 100 takes a total readout time of 32 ms, that is, 8 ms+8 ms+8 ms+8 ms. In this case, a framerate in which the processing time for a single frame is shorter than this time cannot be set. In this embodiment, the pre-change framerate is assumed to be 30 fps (for a processing time for a single frame of approximately 33.3 ms). When the pixel signal readout method is changed from the first readout method to the second readout method and the high framerate is set, the post-change image signal readout time is as follows.

(A+C) image: 8 ms (A+B+C+D) image: 8 ms

Accordingly, the readout of a single frame takes 8 ms+8 ms, that is, 16 ms. In this embodiment, the post-change high framerate is assumed to be 60 fps (for a processing time for a single frame of approximately 16.6 ms). The processing of S506 and S507 is executed at the timing indicated by 604 in FIG. 6.

In S508, the image sensor 100 accumulates a charge on the basis of the framerate set in S507. In S509, the (A+C) image and the (A+B+C+D) image are loaded into the RAM 106 in accordance with the second readout method. This is executed at a timing indicated by 605 in FIG. 6. In S510, the (A+B+C+D) image read out in S509 is displayed in the display unit 105.

In S511, using the disparate image signals read out in S509, the horizontal direction correlation computation is carried out through the above-described imaging plane phase difference AF method, and the focus driving distance (lens driving amount) is calculated. This process is executed at a timing indicated by 606 in FIG. 6.

In S512, the focus is adjusted by correcting a driving end position of the third lens group 119 being driven forward/backward using the focus driving distance calculated in S511. This is executed at a timing indicated by 607 in FIG. 6. In S513, the CPU 103 judges the focus. In this embodiment, the end of the driving of the third lens group 119 is used as the judgment condition, but the focus may be judged using a different condition instead. The process moves to S514 in the case where the focus judgment in S513 has ended. In the case where the focus judgment has not ended, the process returns to S508, where the live view shooting and imaging plane phase difference AF at the high framerate are continued.

The operations from the start timing, indicated by 604 in FIG. 6, to the timing indicated by 608, are executed repeatedly from S508 to S513. In this period, only the horizontal direction correlation computation is executed at the timing indicated by 606, using the (A+C) image and the (A+B+C+D) image read out at the timing indicated by 605. Unlike the timing indicated by 603, the vertical direction and diagonal direction correlation computation results cannot be obtained. However, the lens driving target is corrected at high speed at the timing indicated by 607, and thus the accuracy of focusing on a moving subject, for which an image shift amount can be detected in the horizontal direction, is improved.

In S514, the framerate changed to in S507 (60 fps) is restored to the pre-change framerate (30 fps). In S515, the CPU 103 determines whether or not a shooting end operation has been made through the operation unit 104. Although the shooting end operation is described as a condition for determining the end of shooting in this embodiment, the determination may be based on another condition aside from the shooting end operation. The live view shooting ends in the case where the shooting end operation has been made. However, in the case where the shooting end operation has not been made, the process returns to S501, and the live view shooting and imaging plane phase difference AF are continued. The processing of S514 and S515 is executed at the timing indicated by 608 in FIG. 6.

According to the first embodiment, the first readout method, in which the vertical direction/horizontal direction/diagonal direction correlation computation results can be obtained, is carried out during a period from the start of live view to the start of focusing. The readout method is switched to the second readout method, in which the horizontal direction correlation computation result can be obtained and a higher framerate can be set, during the period from the start of focusing to the end of focusing. In the above-described example, only the horizontal direction correlation computation is described for the second readout method. However, the third readout method (the (A+B) image and the (A+B+C+D) image), in which the vertical direction correlation computation result can be obtained, may be used instead.

As described thus far, according to this embodiment, suppressing the amount of readout data and setting a high framerate makes it possible to quickly obtain the correlation computation results and suppress a drop in the focus accuracy for a moving subject, even if the number of pupil divisions increases and the number of pixel signals increases as a result. Additionally, the lens driving target can be corrected quickly, which makes it possible to carry out the imaging plane phase difference AF at a high level of accuracy while suppressing a drop in the speed of reaching the final focus position.

Second Embodiment

Figure 8:
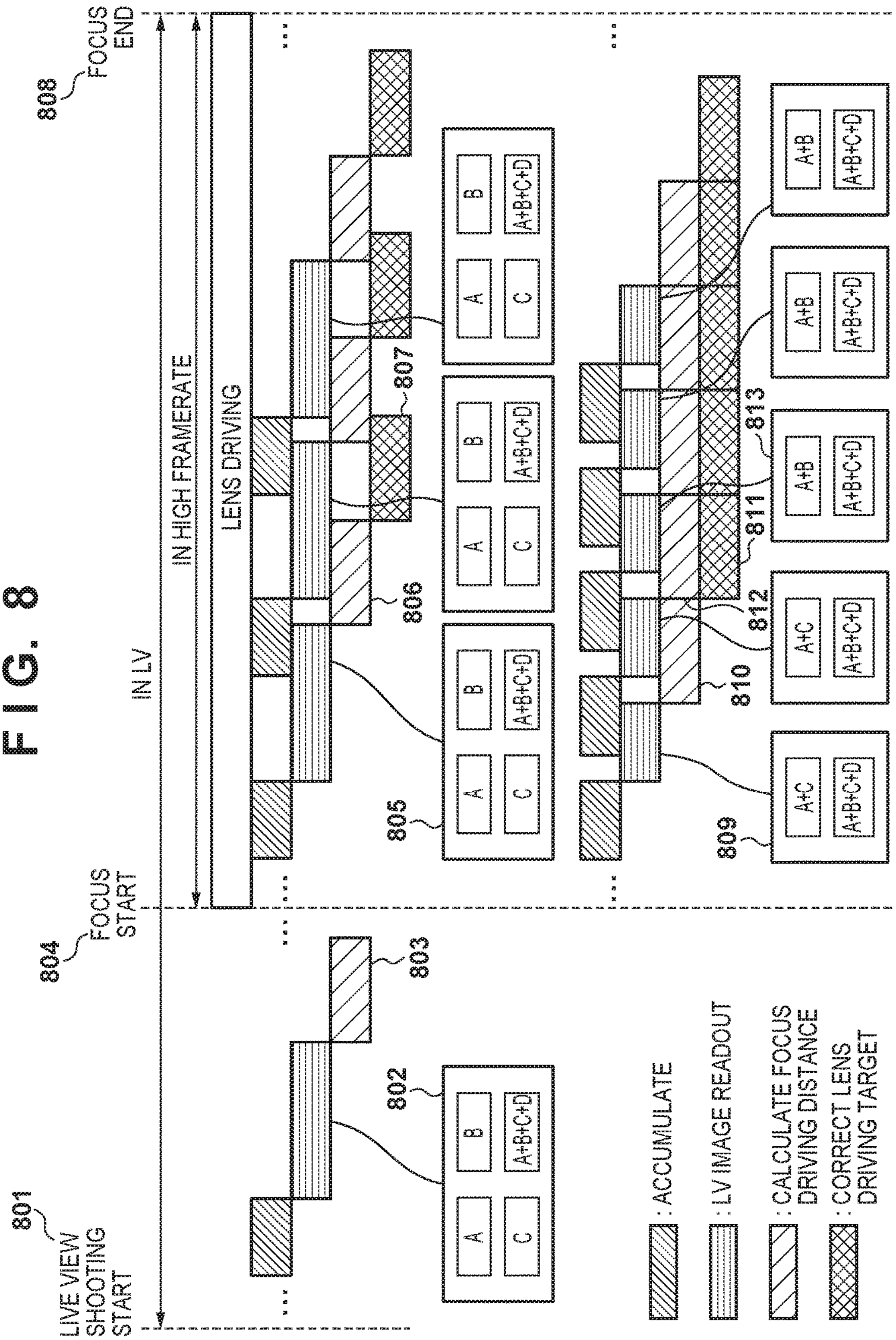
FIG. 8 is a timing chart of the operations in live view shooting according to the second embodiment.

Imaging plane phase difference AF operations according to a second embodiment of the invention will be described next. FIGS. 7A and 7B are flowcharts illustrating imaging plane phase difference AF operations during live view according to the second embodiment. FIG. 8 is a timing chart corresponding to that time.

In S701, the image sensor 100 is exposed and accumulates a charge. The exposure is carried out with the CPU 103 keeping the focal plane shutter 111 in an open state. A charge reset timing and a readout start timing are controlled using the TG 102, and thus the charge is accumulated only for a period between those timings. The light amount is controlled by the aperture actuator 115.

In S702, the A image, the B image, the C image, and the (A+B+C+D) image are read out through the first readout method and loaded into the RAM 106. This is carried out at a timing indicated by 802 in FIG. 8. In S703, a live view image is displayed. The (A+B+C+D) image read out in S702 is displayed in the display unit 105.

In S704, using the image signals read out in S702, the focus driving distance is calculated from the vertical direction/horizontal direction/diagonal direction correlation computation results through the above-described imaging plane phase difference AF method. This is carried out at a timing indicated by 803 in FIG. 8.

In S705, the CPU 103 determines whether or not a focus start operation has been made through the operation unit 104. Although the focus start operation is used as a determination condition in this embodiment, the determination may be made on the basis of a condition aside from the focus start operation. The process moves to S706 in the case where the focus start operation has been made in S705. However, in the case where the focus start operation has not been made, the process returns to S701, and the live view shooting and imaging plane phase difference AF are continued.

The operations from the start timing, indicated by 801 in FIG. 8, to the timing indicated by 804, are executed repeatedly from S701 to S705. During this repetition, the vertical direction, horizontal direction, and diagonal direction correlation computations are made repeatedly using the A image, the B image, the C image, and the (A+B+C+D) image.

In S706, focus adjustment is started using the focus driving distance calculated in S704. The driving of the third lens group 119 forward and backward starts as a result. This is executed at a timing indicated by 805 in FIG. 8.

In S707, the CPU 103 determines whether or not to use the diagonal direction correlation computation result in the imaging plane phase difference AF after the lens driving, on the basis of the correlation computation result calculated in S704. A case where the image shift amount cannot be correctly calculated with the vertical direction/horizontal direction correlation computation results and the image shift amount can only be calculated with the diagonal direction correlation computation result can be given as an example. However, various other conditions may be set as well. In the case where the diagonal direction correlation computation result is used, the process moves to S708, whereas in the case where the diagonal direction correlation computation result is not used, the process moves to S715. The processing of S706 and S707 is executed once at the timing indicated by 804 in FIG. 8.

In S708, the same accumulation process as in S701 is carried out. In S709, the same readout process as in S702 is carried out. This is carried out at a timing indicated by 805 in FIG. 8. In S710, the same live view image display process as in S703 is carried out. In S711, using the image signals read out in S709, the diagonal direction correlation computation is made using the above-described imaging plane phase difference AF method, and the focus driving distance is calculated. This is carried out at a timing indicated by 806 in FIG. 8.

In S712, the focus is adjusted by correcting a driving end position of the third lens group 119 being driven forward/backward using the focus driving distance calculated in S711. This is carried out at a timing indicated by 807 in FIG. 8. In S713, the CPU 103 judges the focus. In this embodiment, the end of the driving of the third lens group 119 is used as the judgment condition, but the focus may be judged using a different condition instead. The process moves to S714 in the case where the focus judgment in S713 has ended. In the case where the focus judgment has not ended, the process returns to S708, where the live view shooting and imaging plane phase difference AF are continued.

The operations from the start timing, indicated by 804 in FIG. 8, to the timing indicated by 808, are executed repeatedly from S708 to S713. During this period, the vertical direction, horizontal direction, and diagonal direction correlation computations are executed repeatedly at the timing indicated by 806 using the A image, the B image, the C image, and the (A+B+C+D) image read out at the timing indicated by 805. The first readout method is executed, and thus the focus can be carried out using the diagonal direction correlation computation result.

In S714, the CPU 103 determines whether or not a shooting end operation has been made through the operation unit 104. Although this embodiment describes the shooting end operation as the condition for the determination, various conditions aside from the shooting end operation may be set instead. The live view shooting ends in the case where the shooting end operation has been made in S714. However, in the case where the shooting end operation has not been made, the process returns to S701, and the live view shooting and imaging plane phase difference AF are continued. This is executed at a timing indicated by 808 in FIG. 8.

In S715, the framerate is changed from 30 fps to the high framerate of 60 fps through the same process as that of S507 in FIG. 5. In S716, the CPU 103 determines whether or not to use the horizontal direction correlation computation result in the imaging plane phase difference AF after the lens driving, on the basis of the correlation computation result calculated in S704. A case where the image shift amount cannot be correctly calculated using the vertical direction correlation computation result but the image shift amount can be calculated using the horizontal direction correlation computation result can be given as an example. However, the determination may be made on the basis of other conditions. In the case where the horizontal direction correlation computation result is used, the process moves to S717, whereas in the case where the horizontal direction correlation computation result is not used, the process moves to S723. The operations of S715 and S716 are executed at the timing indicated by 804 in FIG. 8.

In S717, the image sensor 100 accumulates a charge on the basis of the framerate set in S715. In S718, the (A+C) image and the (A+B+C+D) image are loaded into the RAM 106 in accordance with the second readout method. This is executed at a timing indicated by 809 in FIG. 8. In S719, the (A+B+C+D) image read out in S718 is displayed in the display unit 105.

In S720, using the disparate image signals read out in S718, the horizontal direction correlation computation is carried out through the above-described imaging plane phase difference AF method, and the focus driving distance is calculated. This process is executed at a timing indicated by 810 in FIG. 8.

In S721, the focus is adjusted by correcting a driving end position of the third lens group 119 being driven forward/backward using the focus driving distance calculated in S720. This is executed at a timing indicated by 811 in FIG. 8. In S722, the CPU 103 judges the focus. Although this embodiment describes the end of the driving of the third lens group 119 as the condition for the determination, various other conditions may be set instead. The process moves to S725 in the case where the focus judgment in S722 has ended. In the case where the focus judgment has not ended, the process returns to S716, where the live view shooting and imaging plane phase difference AF at the high framerate are continued.

Aside from the above-described correlation computation result from S704, the CPU 103 can in S716 determine whether or not to use the horizontal direction correlation computation result on the basis of the correlation computation result calculated in S720. For example, a switch is made to use the vertical direction correlation computation result on the basis of a computation result obtained at a timing indicated by 812.

In S723, the image sensor 100 accumulates a charge on the basis of the framerate set in S715. In S724, the (A+B) image and the (A+B+C+D) image are loaded into the RAM 106 in accordance with the third readout method. This is executed at a timing indicated by 813 in FIG. 8.

The operations from the start timing, indicated by 809 in FIG. 8, to the timing indicated by 813, are executed repeatedly from S717 to S724. During this period, the horizontal direction or vertical direction correlation computation is executed repeatedly using the (A+C) image and the (A+B+C+D) image read out at the timing indicated by 809, or the (A+B) image and the (A+B+C+D) image read out at the timing indicated by 813. Executing the second readout method or the third readout method makes it possible to set a high framerate and quickly correct the lens driving target.

In S725, the framerate changed to in S715 is restored to the pre-change framerate, after which the process moves to S714. This is executed at a timing indicated by 808 in FIG. 8.

According to the second embodiment, the first readout method, in which the vertical direction/horizontal direction/diagonal direction correlation computation results can be obtained, is used during a period from the start of live view to the start of focusing. Then, on the basis of the correlation computation result obtained thereby, the readout method to be used during a period from the start of focusing to the end of focusing is determined. The first readout method is continued in the case where the diagonal direction correlation computation result is used. However, the second readout method or the third readout method, in which a higher framerate can be set, is switched to in the case where the up-down/horizontal direction correlation computation results are used.

As described above, suppressing the amount of readout data to the greatest extent possible and setting a high framerate makes it possible to quickly obtain the correlation computation results and suppress a drop in the focus accuracy for a moving subject, even if the number of pupil divisions increases and the number of pixel signals increases as a result. Additionally, the lens driving target can be corrected quickly, which makes it possible to carry out the imaging plane phase difference AF while suppressing a drop in the speed of reaching the final focus position.

Although preferred embodiments of the invention have been described above, the invention is not intended to be limited to these embodiments, and many variations and alterations are possible without departing from the essential spirit of the invention.

OTHER EMBODIMENTS

Embodiments of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-177140, filed Sep. 9, 2016, which is hereby incorporated by reference herein in its entirety.

What is claimed is:

1. An image capturing apparatus comprising:

an image sensor in which pixels are arrayed two-dimensionally, each of the pixels including a plurality of photoelectric conversion elements for a single microlens;

a readout unit capable of switching between carrying out a first readout operation of reading out, from the image sensor and at a first framerate, signals from photoelectric conversion elements corresponding to a first number of pupil areas among a plurality of pupil areas of an imaging optical system and a signal obtained by adding together signals from the photoelectric conversion elements corresponding to all of the pupil areas among the plurality of pupil areas of the imaging optical system, and a second readout operation of reading out, from the image sensor and at a second framerate, signals from photoelectric conversion elements corresponding to a second number, different from the first number, of pupil areas among the plurality of pupil areas of the imaging optical system and a signal obtained by adding together signals from the photoelectric conversion elements corresponding to all of the pupil areas among the plurality of pupil areas of the imaging optical system; and a control unit that controls whether to cause the readout unit to carry out the first readout operation or the second readout operation in accordance with a status of the image capturing apparatus.

2. The image capturing apparatus according to claim 1, wherein the signal obtained by adding together signals from the photoelectric conversion elements corresponding to all of the pupil areas among the plurality of pupil areas of the imaging optical system is a signal obtained by adding together all of the signals from the plurality of photoelectric conversion elements corresponding to the single microlens for each of the pixels in the image sensor.

3. The image capturing apparatus according to claim 1, wherein the signals from the photoelectric conversion elements corresponding to the first number of pupil areas and the signals from the photoelectric conversion elements corresponding to the second number of pupil areas are signals obtained by dividing the plurality of photoelectric conversion elements in each of the pixels into a plurality of groups and then adding the signals from the photoelectric conversion elements in each of the plurality of groups.

4. The image capturing apparatus according to claim 3, wherein the control unit changes the grouping method for dividing the plurality of photoelectric conversion elements into the plurality of groups in the second readout operation on the basis of the signals from the photoelectric conversion elements corresponding to the first number of pupil areas read out in the first readout operation.

5. The image capturing apparatus according to claim 1, wherein the control unit causes the readout unit to carry out the first readout operation in the case where the image capturing apparatus carries out a live view operation and does not carry out lens driving for focus adjustment, and the control unit causes the readout unit to carry out the second readout operation in the case where the image capturing apparatus carries out the live view operation and carries out the lens driving for focus adjustment.

6. The image capturing apparatus according to claim 5, wherein the second framerate is a higher framerate than the first framerate.

7. The image capturing apparatus according to claim 1, further comprising:

a detection unit that detects an image shift amount from the signals from the photoelectric conversion element corresponding to the first number of pupil areas and the signals from the photoelectric conversion elements corresponding to the second number of pupil areas.

8. The image capturing apparatus according to claim 7, further comprising:

a calculation unit that calculates a lens driving amount using the image shift amount.

9. A method of controlling an image capturing apparatus including an image sensor in which pixels are arrayed two-dimensionally, each of the pixels including a plurality of photoelectric conversion elements for a single microlens, the method comprising:

switching between carrying out a first readout operation of reading out, from the image sensor and at a first framerate, signals from photoelectric conversion elements corresponding to a first number of pupil areas among a plurality of pupil areas of an imaging optical system and a signal obtained by adding together signals from the photoelectric conversion elements corresponding to all of the pupil areas among the plurality of pupil areas of the imaging optical system, and a second readout operation of reading out, from the image sensor and at a second framerate, signals from photoelectric conversion elements corresponding to a second number, different from the first number, of pupil areas among the plurality of pupil areas of the imaging optical system and a signal obtained by adding together signals from the photoelectric conversion elements corresponding to all of the pupil areas among the plurality of pupil areas of the imaging optical system; and controlling whether to cause the first readout operation or the second readout operation to be carried out in accordance with a status of the image capturing apparatus.

10. A non-transitory computer-readable storage medium storing a program for causing a computer to execute the steps of a method of controlling an image capturing apparatus including an image sensor in which pixels are arrayed two-dimensionally, each of the pixels including a plurality of photoelectric conversion elements for a single microlens, the method comprising:

switching between carrying out a first readout operation of reading out, from the image sensor and at a first framerate, signals from photoelectric conversion elements corresponding to a first number of pupil areas among a plurality of pupil areas of an imaging optical system and a signal obtained by adding together signals from the photoelectric conversion elements corresponding to all of the pupil areas among the plurality of pupil areas of the imaging optical system, and a second readout operation of reading out, from the image sensor and at a second framerate, signals from photoelectric conversion elements corresponding to a second number, different from the first number, of pupil areas among the plurality of pupil areas of the imaging optical system and a signal obtained by adding together signals from the photoelectric conversion elements corresponding to all of the pupil areas among the plurality of pupil areas of the imaging optical system; and controlling whether to cause the first readout operation or the second readout operation to be carried out in accordance with a status of the image capturing apparatus.

* * * * *